United States Patent [19]
Hood et al.

[11] Patent Number: 5,370,483
[45] Date of Patent: Dec. 6, 1994

[54] DIRECT TENSION INDICATOR WASHER

[75] Inventors: A. Craig Hood, Wayne, Pa.; Lloyd J. Larson, Buffalo, Minn.

[73] Assignee: J & M Turner, Inc., Southampton, Pa.

[21] Appl. No.: 81,636

[22] Filed: Jun. 24, 1993

[51] Int. Cl.⁵ ............................................. F16B 31/02
[52] U.S. Cl. ...................................... 411/10; 411/14; 116/DIG. 34
[58] Field of Search .......................... 411/2, 9, 10, 14; 116/DIG. 34

[56] References Cited

U.S. PATENT DOCUMENTS

| | | |
|---|---|---|
| 2,570,863 | 10/1951 | Rowe . |
| 3,187,621 | 6/1965 | Turner ........................... 411/10 |
| 3,285,120 | 11/1966 | Kartiala . |
| 3,512,447 | 5/1970 | Vaughn . |
| 3,534,651 | 10/1970 | Belfiglio . |
| 4,020,734 | 5/1977 | Bell . |
| 4,518,295 | 5/1985 | Matuschek . |
| 4,692,076 | 9/1987 | Herb . |
| 4,773,272 | 9/1988 | Trungold . |
| 4,887,948 | 12/1989 | Calmettes . |
| 4,889,457 | 12/1989 | Hageman . |
| 5,015,132 | 5/1991 | Turner et al. ................... 411/10 |

FOREIGN PATENT DOCUMENTS

| | | |
|---|---|---|
| 0100555 | 2/1984 | European Pat. Off. . |
| 2403484 | 4/1979 | France . |
| 2425575 | 12/1979 | France . |
| 1023639 | 1/1958 | Germany . |
| 1006452 | 10/1965 | United Kingdom . |
| 1116948 | 6/1968 | United Kingdom . |
| 1144080 | 3/1969 | United Kingdom . |
| 2107108 | 4/1983 | United Kingdom ............. 411/10 |

*Primary Examiner*—Neill R. Wilson
*Attorney, Agent, or Firm*—Ratner & Prestia

[57] ABSTRACT

A pre-load indicating washer in which a plurality of protuberances, struck and partially sheared from the annular body of the washer, are pushed under load back into a corresponding plurality of indentations in the annular body which are formed when the protuberances are formed. The mass of material defined by each protuberance/indentation pair is concentrated along the lengthwise central region of the protuberance/indentation pair, thereby stiffening the protuberance, so that when load is applied to the washer, the protuberance will first undergo elastic deformation prior to collapsing back into the indentation from which it was formed.

13 Claims, 1 Drawing Sheet

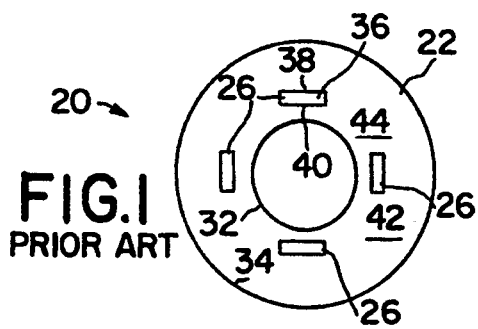
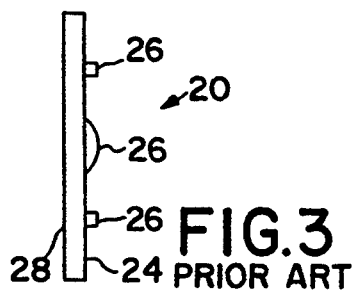
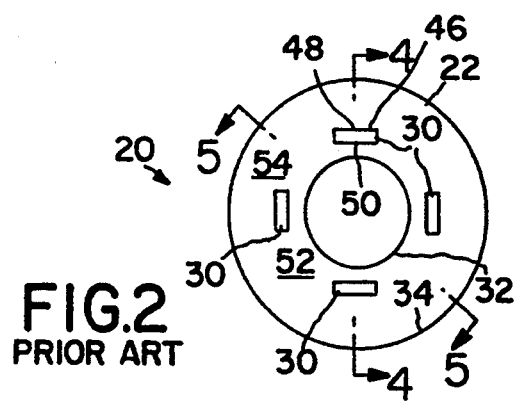
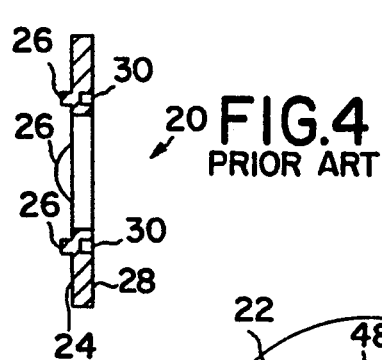
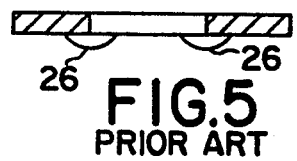
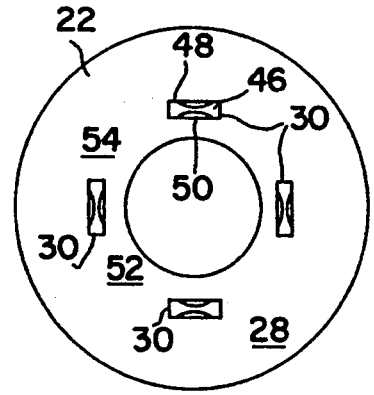
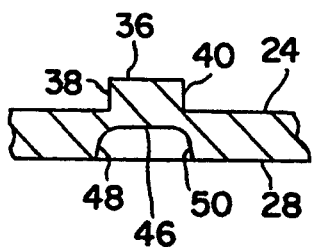
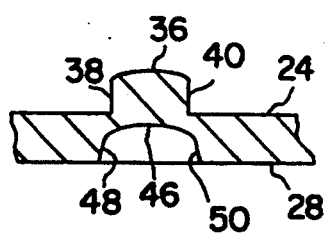
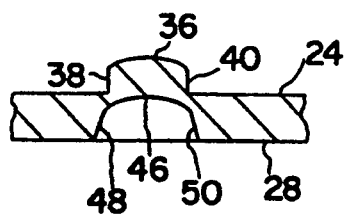

DIRECT TENSION INDICATOR WASHER

TECHNICAL FIELD

The present invention relates, in general, to the installation of fasteners and, in particular, to a pre-load indicating washer for use with a fastener which enables the desired tension of a fastener to be achieved during installation of the fastener in a joint.

BACKGROUND OF THE INVENTION

It is well known to those skilled in the art that the most accurate way to install tension into a fastener in a joint is to control tightening by developing an indication of the tension in the fastener either directly from the fastener or another component used with the fastener. Fastener installation based on torque control can result in wide variations in the tension in the fastener because of variations in fastener lubricity, burrs on the thread of threaded fasteners, and variations in the friction at the surface of the joint component against which the bearing surface of a threaded fastener bears.

U.S. Pat. Nos. 3,187,621 and 5,015,132 are directed to pre-load indicating washers adapted for use with a threaded fastener and intended to develop an indication of proper tensioning of the fastener. These pre-load indicating washers each have a plurality of protuberances which are struck and partially sheared from the annular body to leave indentations in the annular body. With these pre-load indicating washers in a joint, the protuberances are pushed back into the indentations in the annular body from which they were formed as the joint is tightened and tightening is stopped when the protuberances have been "collapsed" back into the indentations in the annular body by a prescribed amount. This condition, typically, is sensed by a "feeler" gage inserted into a gap in the joint.

Under certain conditions, particularly with washers used with large-size fasteners, typically 1" in diameter and larger, these washers may produce inaccurate tension indications which fall outside the acceptable range of tensioning of the fastener. This is due to the protuberance not travelling back (i.e. "collapsing") uniformly into the indentation from which it was formed under the compressive load which is applied when the joint is being tightened. The protuberance, under compressive load, deforms plastically prematurely and partially collapses prior to the protuberance, as a whole, travelling back (i.e. "collapsing") into the associated indentation. The width of the protuberance/indentation combination of washers used with large-size fasteners is such that the mass of material at generally the center, which first feels the effect of the compressive load, cannot withstand the compressive load and begins to collapse prior to the protuberance, as a whole, travelling back into the indentation from which it was formed, leading to erratic and unreliable performance results.

SUMMARY OF THE INVENTION

A pre-load indicating washer, constructed in accordance with the present invention, includes an annular body and a plurality of pairs of (a) protuberances integral with the annular body struck and partially sheared from the annular body to project from a first face of the annular body, and (b) indentations left in a second face of the annular body opposite from the first face upon formation of the protuberances. Each of the protuberances is defined by (a) a pair of outer side walls extending away from the first face of the annular body, and (b) an outer surface extending between the pair of outer side walls and between two spaced regions of the first face of the annular body. Each of the indentations defined by (a) a pair of inner side walls extending through the annular body from the second face of the annular body and from which a pair of outer side walls of one of the protuberances has been sheared, and (b) an inner surface extending between the pair of inner side walls and between two spaced regions of the second face of the annular body. Each pair of protuberances and indentations is formed with a mass concentration along a central region between the outer side walls of the protuberance and the inner side walls of the indentation and extending along a selected length between the two spaced regions of the first face of the annular body and the two spaced regions of the second face of the annular body.

BRIEF DESCRIPTION OF THE DRAWINGS

FIG. 1 is a plan view of one face of a prior art pre-load indicating washer.

FIG. 2 is a plan view of the opposite face of the FIG. 1 pre-load indicating washer.

FIG. 3 is an elevation view of the FIGS. 1 and 2 pre-load indicating washer.

FIG. 4 is a sectional view taken along lines 4—4 of FIG. 2.

FIG. 5 is a sectional view taken along lines 5—5 of FIG. 2

FIGS. 6 and 7, show on an enlarged scale, profiles of two different protuberance/indentation arrangements which can be incorporated in a pre-load indicating washer constructed in accordance with the present invention taken at the centers of the protuberance/indentation arrangements.

FIG. 8 is a plan view, generally similar to FIG. 2, with the protuberance/indentation pairs of the pre-load indicating washer arranged with a profile as shown in FIG. 6.

FIG. 9 shows, on an enlarged scale, a profile of the FIG. 7 protuberance/indentation arrangement taken slightly away from the center of the protuberance/indentation arrangement.

DESCRIPTION OF THE PRIOR ART

U.S. Pat. No. 3,187,621 is incorporated by reference as if its entire contents were fully set forth herein. FIGS. 1 through 5, identified as "PRIOR ART," correspond to FIGS. 1 through 6 of U.S. Pat. No. 3,187,621.

Referring to FIGS. 1 through 5, the pre-load indicating washer 20 comprises an annular body 22 which has, on a first face 24, a plurality of protuberances 26 which are formed by displacement of metal as a result of indenting a second face 28 to partially shear the metal and form a corresponding plurality of indentations 30 in the second face. Protuberances 26 are spaced circumferentially at regular intervals between the circular inner periphery 32 of annular body 22 and the circular outer periphery 34 of the annular body. Protuberances 26 are substantially oblong in outline, each with its greater length extending in the direction of a line tangential to a circle around and concentric with the inner periphery 32 of annular body 22. Each protuberance 26 has a convex outer surface 36 extending between a pair of outer side walls 38 and 40 and extending arcuately in the direction of its greater length between two spaced regions 42 and 44 of face 24 of annular body 22. Side walls 38 and 40 of protuberances 26 extend substantially tangential to circles concentric with circular inner periphery 32 of annular body 22. Each indentation 30 has a concave inner surface 46 extending between a pair of inner side walls 48 and 50 and extending arcuately in the direction of its greater length between two spaced regions 52 and 54 of face 28 of annular body 22. Side walls 48 and 50 of indentations 30 extend substantially tangential to circles concentric with circular inner periphery 32 of annular body 22. Concave inner surfaces 46 of indentations 30 are substantially complementary to their associated convex outer surfaces 36 of protuberances 26. With this pre-load indicating washer in a joint, the protuberances are pushed back into their associated indentations in the annular body as the joint is tightened and tightening is stopped when the protuberances have been "collapsed" back into the indentations in the annular body by a prescribed amount.

DETAILED DESCRIPTION OF THE INVENTION

FIGS. 1 through 5, besides being descriptive of the prior art, also are used in this application to illustrate the general arrangement of a pre-load indicating washer constructed in accordance with the present invention in that the two have a number of similar features. The remaining figures indicate the manner in which the pre-load indicating washer of the present invention differs from the prior art.

Accordingly, a pre-load indicating washer, constructed in accordance with the present invention, includes an annular body 22 and a plurality of pairs of (a) protuberances 26 integral with the annular body struck and partially sheared from the annular body to project from a first face 24 of the annular body, and (b) indentations 30 left in a second face 28 of the annular body opposite from the first face upon formation of the protuberances.

Each of the protuberances 26 is defined by (a) a pair of outer side walls 38 and 40 extending away from the first face 24 of annular body 22, and (b) an outer surface 36 extending between the pair of outer side walls and between two spaced regions 42 and 44 of the first face of the annular body. Each of the indentations 30 is defined by (a) a pair of inner side walls 48 and 50 extending through the annular body from the second face 28 of the annular body and from which a pair of outer side walls of one of the protuberances has been sheared, and (b) an inner surface 46 extending between the pair of inner side walls and between two spaced regions 52 and 54 of the second face of the annular body.

Up to this point in the description of a pre-load indicating washer, constructed in accordance with the present invention, this washer is generally similar to the one described and illustrated in U.S. Pat. No. 3,187,621. FIGS. 6 through 8 illustrate how the present invention differs from the pre-load indicating washer of U.S. Pat. No. 3,187,621.

As indicated above, when such pre-load indicating washers are used with certain sizes of fasteners, typically 1" in diameter or larger, they can produce inaccurate tension indications which fall outside the acceptable range of tensioning of the fastener.

In accordance with the present invention, each pair of protuberances 26 and indentations 30 is formed with amass concentration along the central region between the outer side walls 38 and 40 of the protuberance and the inner side walls 48 and 50 of the indentation. This mass concentration extends along a selected length between the two spaced regions 42 and 44 of the first face 24 of annular body 22 and the two spaced regions 52 and 54 of the second face 28 of the annular body. By such a concentration of mass, so that a greater percentage of the material is at or towards the central region of the protuberance/indentation combination, the protuberance/indentation combination is stiffened. As a result, when a compressive load is applied, the protuberance will collapse back into its associated indentation first by elastic deformation, rather than by plastic deformation. The protuberance cannot collapse plastically as long as it deforms elastically, so that premature collapse of the protuberance is prevented.

As shown by FIG. 6, according to a first embodiment of the present invention, the regions at which inner side walls 48 and 50 of each indentation 30 meet inner surface 46 of the indentation have a radius of curvature which concentrates the mass of material between the inner surface of the indentation and the associated outer surface 36 of protuberance 26 along the central region between the outer side walls 38 and 40 of the protuberance and the inner side walls of the indentation. Such a mass concentration of material can be achieved, for example, with a radius of curvature preferably from 1/32" to 1/16", whereby the thickness of the material between inner surface 46 of the indentation and outer surface 36 of the protuberance in this region of the protuberance/indentation combination is less than at the central region of the protuberance/indentation combination.

As shown by FIG. 7, according to a second embodiment of the present invention, both the outer surface 36 of each protuberance 26 and the inner surface 46 of each indentation are curved with a radius of curvature which concentrates the mass of material between the inner surface of the indentation and the associated outer surface of protuberance along the central region between the outer side walls 38 and 40 of the protuberance and the inner side walls 48 and 50 of the indentation. Such a mass concentration of material can be achieved, for example, with a radius of curvature preferably from 0.288" to 0.320", with the centers of the curvature offset, whereby the thickness of the material between inner surface 46 of the indentation and outer surface 36 of the protuberance diminishes from a maximum at the central region of the protuberance/indentation combination. Although difficult to observe from FIGS. 7 and 9 because of scaling, the thickness of the material between inner surface 46 of the indentation and outer surface 36 of the protuberance is less in FIG. 9, where the profile is taken slightly away from the center of the protuberance/indentation arrangement, than in FIG. 7 where the profile is taken at the center of the protuberance/indentation arrangement.

Preferably, the selected length over which the mass concentration extends is less than the distance between the two spaced regions 42 and 44 of the first face 24 of annular body 22 and less than the distance between the two spaced regions 52 and 54 of the second face 28 of the annular body. This is shown in FIG. 8 which is a view looking into indentations 30 formed according to FIG. 6. The bulging of inner side walls 48 and 50, whereby the indentation has a "bow-tie" shape, indicates that the selected length over which the mass concentration extends is less than the distance between the two spaced regions 42 and 44 of the first face 24 of annular body 22 and less than the distance between the two spaced regions 52 and 54 of the second face 28 of the annular body. As with the first embodiment of the present invention, preferably, the selected length over which the mass concentration extends is less than the distance between the two spaced regions 42 and 44 of the first face 24 of annular body 22 and less than the distance between the two spaced regions 52 and 54 of the second face 28 of the annular body.

While in the foregoing there have been described preferred embodiments of the present invention, it should be obvious to those skilled in the art that various modifications and changes can be made without departing from the true spirit and scope of the invention.

What is claimed:

1. A pre-load indicating washer comprising an annular body and a plurality of pairs of:
   (a) protuberances integral with said annular body struck and partially sheared from said annular body to project from a first face of said annular body, and
   (b) indentations left in a second face of said annular body opposite from said first face upon formation of said protuberances,
   each of said protuberances defined by:
   (a) a pair of outer side walls extending away from said first face of said annular body, and
   (b) an outer surface extending between said pair of outer side walls and between two spaced regions of said first face of said annular body, and
   each of said indentations defined by:
   (a) a pair of inner side walls extending through said annular body from said second face of said annular body and from which a pair of outer side walls of one of said protuberances has been sheared, and
   (b) an inner surface extending between said pair of inner side walls and between two spaced regions of said second face of said annular body,
   each pair of said protuberances and indentations formed with a mass concentration along a central region between said outer side walls of said protuberance and said inner side walls of said indentation and extending along a selected length between said two spaced regions of said first face of said annular body and said two spaced regions of said second face of said annular body.

2. A pre-load indicating washer according to claim 1 wherein the regions at which said inner side walls of said indentations meet said inner surfaces of said indentations have a radius curvature of at least 1/32".

3. A pre-load indicating washer according to claim 1 wherein the regions at which said inner side walls of said indentations meet said inner surfaces of said indentations have a radius curvature of 1/32" to 1/16".

4. A pre-load indicating washer according to claim 1 wherein both said outer surface of said protuberance and said inner surface of said indentation are curved with a radius of curvature of at least 0.288".

5. A pre-load indicating washer according to claim 1 wherein both said outer surface of said protuberance and said inner surface of said indentation are curved with a radius of curvature of 0.288" to 0.320".

6. A pre-load indicating washer according to claim 2 wherein said selected length over which said mass concentration extends is less than the distance between said two spaced regions of said first face of said annular body and less than the distance between said two spaced regions of said second face of said annular body.

7. A pre-load indicating washer according to claim 3 wherein said selected length over which said mass concentration extends is less than the distance between said two spaced regions of said first face of said annular body and less than the distance between said two spaced regions of said second face of said annular body.

8. A pre-load indicating washer according to claim 4 wherein said selected length over which said mass concentration extends is less than the distance between said two spaced regions of said first face of said annular body and less than the distance between said two spaced regions of said second face of said annular body.

9. A pre-load indicating washer according to claim 5 wherein said selected length over which said mass concentration extends is less than the distance between said two spaced regions of said first face of said annular body and less than the distance between said two spaced regions of said second face of said annular body.

10. A pre-load indicating washer according to claim 6 adapted to function with a fastener having a diameter of at least 1".

11. A pre-load indicating washer according to claim 7 adapted to function with a fastener having a diameter of at least 1".

12. A pre-load indicating washer according to claim 8 adapted to function with a fastener having a diameter of at least 1".

13. A pre-load indicating washer according to claim 9 adapted to function with a fastener having a diameter of at least 1".

* * * * *

UNITED STATES PATENT AND TRADEMARK OFFICE
CERTIFICATE OF CORRECTION

PATENT NO.    : 5,370,483
DATED         : December 6, 1994
INVENTOR(S)   : Hood et al.

It is certified that error appears in the above-identified patent and that said Letters Patent is hereby corrected as shown below:

ON THE TITLE PAGE:

The following references should be added to Field [56] - References Cited

U.S. PATENT DOCUMENTS
    3,890,876      6/1975    Dahl

FOREIGN PATENT DOCUMENTS
    2 263 745      8/1993    United Kingdom

Signed and Sealed this

Second Day of May, 1995

Attest:

BRUCE LEHMAN

*Attesting Officer*  *Commissioner of Patents and Trademarks*